United States Patent
Yoshii

(10) Patent No.: US 10,315,273 B2
(45) Date of Patent: Jun. 11, 2019

(54) LASER PROCESSING APPARATUS

(71) Applicant: DISCO CORPORATION, Tokyo (JP)

(72) Inventor: Shungo Yoshii, Tokyo (JP)

(73) Assignee: Disco Corporation, Tokyo (JP)

( * ) Notice: Subject to any disclaimer, the term of this patent is extended or adjusted under 35 U.S.C. 154(b) by 372 days.

(21) Appl. No.: 15/222,290

(22) Filed: Jul. 28, 2016

(65) Prior Publication Data

US 2017/0043432 A1 Feb. 16, 2017

(30) Foreign Application Priority Data

Aug. 11, 2015 (JP) .................................. 2015-158860

(51) Int. Cl.
| | |
|---|---|
| *B23K 26/142* | (2014.01) |
| *B23K 26/00* | (2014.01) |
| *B23K 26/55* | (2014.01) |
| *B23K 26/18* | (2006.01) |
| *B23K 26/361* | (2014.01) |

(52) U.S. Cl.
CPC .......... *B23K 26/142* (2015.10); *B23K 26/361* (2015.10)

(58) Field of Classification Search
CPC .... B23K 26/142; B23K 26/361; B29C 64/20; B29C 64/35
See application file for complete search history.

(56) References Cited

U.S. PATENT DOCUMENTS

| | | | | | |
|---|---|---|---|---|---|
| 3,626,141 | A | * | 12/1971 | Daly ................. | B23K 26/0853 219/121.68 |
| 3,866,398 | A | * | 2/1975 | Vernon, Jr. .......... | B08B 15/007 134/1.3 |
| 4,027,137 | A | * | 5/1977 | Liedtke ................ | B23K 26/123 219/121.6 |
| 4,295,808 | A | * | 10/1981 | Stephan .................... | B22F 9/10 425/174 |
| 4,897,520 | A | * | 1/1990 | Carter ..................... | B08B 15/04 219/121.68 |
| 5,662,762 | A | * | 9/1997 | Ranalli ................. | B08B 7/0042 156/707 |
| 6,683,277 | B1 | * | 1/2004 | Millard ................ | B23K 26/123 219/121.84 |
| 6,833,222 | B1 | * | 12/2004 | Buzerak ................... | G03F 1/64 156/267 |

(Continued)

FOREIGN PATENT DOCUMENTS

| | | |
|---|---|---|
| JP | 2007-069249 | 3/2007 |
| JP | 2014-036987 | 2/2014 |
| JP | 2014-124648 | 7/2014 |

*Primary Examiner* — Joseph S Del Sole
*Assistant Examiner* — Emmanuel S Luk
(74) *Attorney, Agent, or Firm* — Greer, Burns & Crain Ltd.

(57) ABSTRACT

A laser processing apparatus has a suction unit for suctioning debris. The suction unit includes a debris trapping chamber and a cleaning unit for cleaning the inside of the debris trapping chamber. The cleaning unit includes a shutter for closing an opening of the debris trapping chamber and a cleaning water supply port for supplying cleaning water to the debris trapping chamber when the opening thereof is closed. The shutter closes the opening of the debris trapping chamber, the suction unit exerts a suction through the suction port, and cleaning water is supplied from the cleaning water supply port to the debris trapping chamber and suctioned through the suction port to clean the inside of the debris trapping chamber.

20 Claims, 3 Drawing Sheets

(56) References Cited

U.S. PATENT DOCUMENTS

| | | | | |
|---|---|---|---|---|
| 8,283,596 | B2* | 10/2012 | Murase | B23K 26/0732 |
| | | | | 219/121.84 |
| 9,259,802 | B2* | 2/2016 | Willey | B08B 15/04 |
| 9,387,554 | B2* | 7/2016 | Gadd | B23K 26/16 |
| 2003/0197909 | A1* | 10/2003 | Beyer | B08B 15/04 |
| | | | | 359/509 |
| 2003/0217809 | A1* | 11/2003 | Morishige | B23K 26/03 |
| | | | | 156/345.5 |
| 2004/0226927 | A1* | 11/2004 | Morikazu | B23K 26/123 |
| | | | | 219/121.84 |
| 2008/0210675 | A1* | 9/2008 | Sasaki | B23K 26/1476 |
| | | | | 219/121.84 |
| 2014/0305917 | A1* | 10/2014 | Gadd | B23K 26/36 |
| | | | | 219/121.72 |
| 2016/0303688 | A1* | 10/2016 | De Souza | B23K 26/21 |
| 2017/0274474 | A1* | 9/2017 | Nie | B23K 26/0006 |
| 2017/0301928 | A1* | 10/2017 | Young | H01M 2/0267 |
| 2018/0200832 | A1* | 7/2018 | Izumi | B23K 26/142 |

\* cited by examiner

LASER PROCESSING APPARATUS

BACKGROUND OF THE INVENTION

Field of the Invention

The present invention relates to a laser processing apparatus which has a function to suction debris produced by a laser processing process.

Description of the Related Art

When an ablation process is carried on a plate-shaped workpiece to form a processed groove in the surface thereof by applying a pulsed laser beam which has a wavelength absorbable by the plate-shaped workpiece, the plate-shaped workpiece tends to be fused, producing debris. In order to prevent the debris from being attached to the surface of the plate-shaped workpiece, it is customary to form a protective film on the surface of the plate-shaped workpiece, so that the debris will be deposited on the protective film and then removed together with the protective film after the plate-shaped workpiece has been processed. There has also been proposed an apparatus for reducing debris attached to the protective film on a dicing line with a suction mechanism for suctioning a processing spot that is irradiated with the laser beam.

SUMMARY OF THE INVENTION

During the ablation process, the laser beam is focused at a point within the plate-shaped workpiece, and while the plate-shaped workpiece is processed, the protective film is fused, though not burned. Therefore, the suction mechanism suctions the debris and also the fused protective film, and the fused protective film is liable to lower the suctioning capability of the suction mechanism to the extent that it fails to suction the debris sufficiently. Due to the insufficient suctioning of the debris, debris tends to be left on the protective film and block the laser beam, making the processing of the plate-shaped workpiece incomplete. The insufficient suctioning of the debris also causes debris to gather in the optical path of the laser beam in a manner to block the laser beam, resulting in incomplete processing of the plate-shaped workpiece.

It is therefore an object of the present invention to provide a laser processing apparatus which suctions debris sufficiently and whose suctioning capability will not be lowered.

In accordance with an aspect of the present invention, there is provided a laser processing apparatus for performing an ablation process on a plate-shaped workpiece held on a chuck table by applying a laser beam to a face side of the plate-shaped workpiece through a water-soluble protective film which protects the face side of the plate-shaped workpiece, including a beam condenser for converging the laser beam, and a processing nozzle for guiding the laser beam which is converged by the beam condenser to the plate-shaped workpiece and suctioning and discharging debris scattered from the plate-shaped workpiece. The processing nozzle includes a laser beam passage port for passing therethrough the laser beam converged by the beam condenser and guiding the laser beam to the plate-shaped workpiece, and suction means for suctioning debris that is scattered from the plate-shaped workpiece by the application thereto of the laser beam having passed through the laser beam passage port. The suction means includes a debris trapping chamber defined by an upper wall in which the laser beam passage port is formed, a side wall hanging from the upper wall, and a lower wall facing the upper wall and having an opening for trapping debris, a suction port holding the debris trapping chamber in fluid communication with a suction source, and cleaning means for cleaning the inside of the debris trapping chamber. The cleaning means includes a shutter for closing the opening of the debris trapping chamber, and a cleaning water supply port for supplying cleaning water to the debris trapping chamber when the opening is closed. The shutter closes the opening of the debris trapping chamber, the cleaning water supply port supplies cleaning water to the debris trapping chamber, and the supplied cleaning water is suctioned through the suction port to clean the inside of the debris trapping chamber.

Preferably, the cleaning means further includes a cleaning air ejection port for ejecting air across the laser beam passage port toward the suction port to clean the laser beam passage port, and the cleaning air ejection port ejects air to clean the inside of the debris trapping chamber.

With the laser processing apparatus according to the present invention, the suction means suctions debris on the protective film sufficiently, and the suctioned debris is prevented from remaining in the debris trapping chamber, so that the suctioning capability of the suction means is prevented from being lowered.

Inasmuch as the suction means includes the cleaning air ejection port for ejecting air across the laser beam passage port toward the suction port to clean the laser beam passage port, the optical path of the laser beam is prevented from being clogged off when the plate-shaped workpiece is laser-processed.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
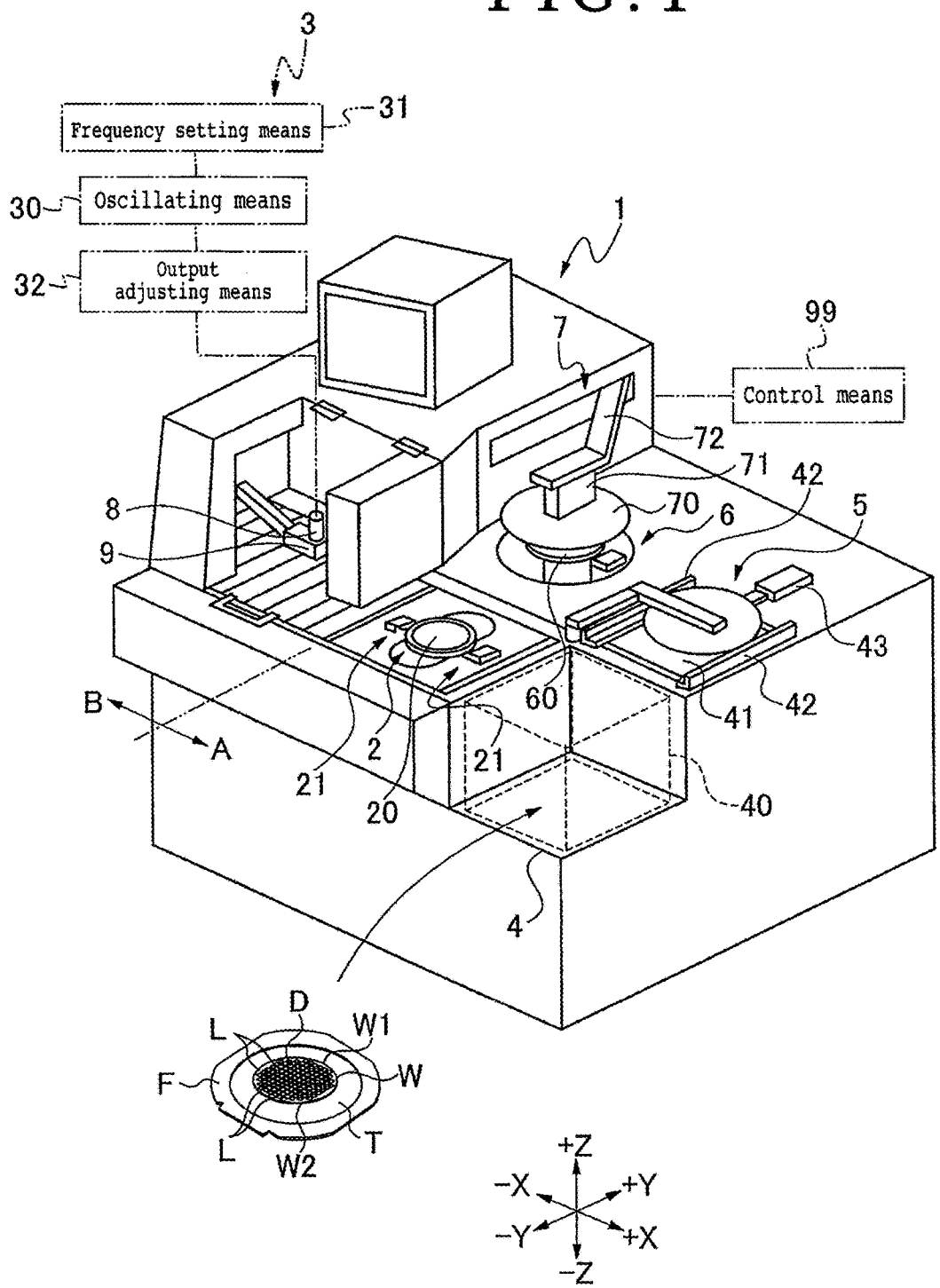
FIG. 1 is a perspective view of a laser processing apparatus according to an embodiment of the present invention.

As shown in FIG. 1, a laser processing apparatus 1 according to an embodiment of the present invention is an apparatus configured to process a plate-shaped workpiece W held on a chuck table 2 by using laser processing means 3. The plate-shaped workpiece W has a reverse side W2 applied to a tape T to which a ring-like frame F is applied. The plate-shaped workpiece W is supported on the frame F by the tape T. The plate-shaped workpiece W has a face side W1 which is divided by a plurality of crossing projected dicing lines L into areas where a plurality of devices D are formed.

The laser processing apparatus 1 includes, in its front portion in the direction indicated by the arrow −Y, a cassette placement area 4 where a cassette 40 housing a plurality of plate-shaped workpieces W supported on respective frames F is placed. The cassette placement area 4 is vertically movable. A temporary placement area 41 for temporarily placing therein a plate-shaped workpiece W supported on a frame F is disposed rearwardly of the cassette placement area 4 in the direction indicated by the arrow +Y. The temporary placement area 41 is provided with positioning means 42 for aligning a plate-shaped workpiece W with a predetermined position. Loading/unloading means 43 for unloading and loading a plate-shaped workpiece W supported on a frame F from and into the cassette 40 is disposed rearwardly of the temporary placement area 41 in the direction indicated by the arrow +Y.

The laser processing apparatus 1 also includes a chuck table 2 provided with an attracting unit 20 for holding a plate-shaped workpiece W under suction and a fastening unit 21 for fixing a frame F. The chuck table 2 is movable along X-axis directions between an installing/removing area A in which a plate-shaped workpiece W supported on a frame F is installed on and removed from the chuck table 2 and a processing region B in which a plate-shaped workpiece W supported on a frame F is processed by a laser beam. The chuck table 2 is also movable along Y-axis directions.

Protective film forming means 6 for forming a protective film on the face side W1 of a plate-shaped workpiece W to be processed is disposed rearwardly of the installing/removing area A in the direction indicated by the arrow +Y. The protective film forming means 6 includes a holder 60 for holding and rotating a plate-shaped workpiece W supported on a frame F, and a nozzle, not shown, for dropping a liquid resin onto a plate-shaped workpiece W that is held by the holder 60. First transport means 5 for transporting a plate-shaped workpiece W supported on a frame F between the temporary placement area 41 and the protective film forming means 6 is disposed in the vicinity of the temporary placement area 41.

Second transport means 7 for transporting a plate-shaped workpiece W supported on a frame F from the protective film forming means 6 to the chuck table 2 in the installing/removing area A is disposed above the protective film forming means 6. The second transport means 7 includes an attracting unit 70 for holding a plate-shaped workpiece W under suction, a lifting and lowering unit 71 for lifting and lowering the attracting unit 70, and an arm 72 for moving the attracting unit 70 and the lifting and lowering unit 71 along the Y-axis directions.

The laser processing means 3 includes oscillating means 30 for oscillating a laser beam, frequency setting means 31 for setting a repetitive frequency for the laser beam, output adjusting means 32 for adjusting the output power of the laser beam, a beam condenser 8 for converging the laser beam, and a processing nozzle 9 for guiding the laser beam converged by the beam condenser 8 to the plate-shaped workpiece W and suctioning and discharging debris scattered from the plate-shaped workpiece W.

Figure 2:
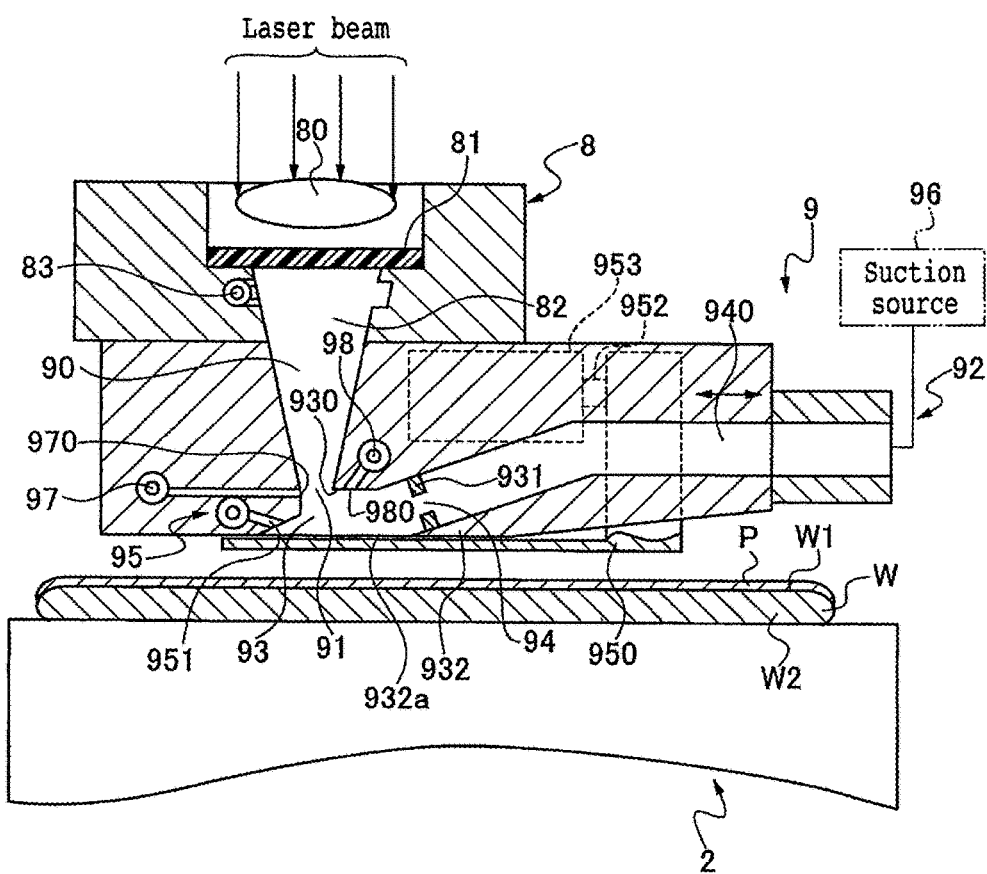
FIG. 2 is a cross-sectional view showing structural details of a beam condenser and a processing nozzle of the laser processing apparatus.

As shown in FIG. 2, the beam condenser 8 includes a condensing lens 80 disposed on the optical path of the laser beam and a cover glass 81 disposed beneath the condensing lens 80. Below the cover glass 81, there is a space 82 for passing the laser beam therethrough, defined by a side wall having a processing air supply passage 83 for ejecting air in a direction perpendicular to the optical path of the laser beam.

The processing nozzle 9 is provided with a space 90 held in fluid communication with the space 82 of the beam condenser 8, a laser beam passage port 91 for passing therethrough the laser beam converged by the beam condenser 8 and guiding the laser beam to the plate-shaped workpiece W, and suction means 92 for suctioning debris that is scattered from the plate-shaped workpiece W by the application thereto of the laser beam having passed through the laser beam passage port 91.

The suction means 92 includes a debris trapping chamber 93 defined by an upper wall 930 in which the laser beam passage port 91 is formed, a side wall 931 hanging from the upper wall 930, and a lower wall 932 facing the upper wall 930 and having an opening 932a for trapping debris, a suction port 94 holding the debris trapping chamber 93 in fluid communication with a suction source 96, and cleaning means 95 for cleaning the inside of the debris trapping chamber 93. The suction port 94 is held in fluid communication with the suction source 96 through a suction channel 940.

The cleaning means 95 includes a shutter 950 for closing the opening 932a of the debris trapping chamber 93, a shutter actuator 955 (FIG. 4) for actuating the shutter 950, and a cleaning water supply port 951 for supplying cleaning water to the debris trapping chamber 93 when the opening 932a is closed.

On one side of the laser beam passage port 91, there is disposed in the upper wall 930 cleaning air supply means 97 for ejecting cleaning air into the laser beam passage port 91. Specifically, the cleaning air supply means 97 ejects cleaning air from a cleaning air ejection port 970 across the laser beam passage port 91 toward the suction port 94. Specifically, the cleaning air is ejected from the cleaning air ejection port 970 perpendicularly to the direction along which the laser beam passes through the laser beam passage port 91. Cleaning water supply means 98 for ejecting cleaning water into the opening 932a is also disposed in the upper wall 930. The cleaning water supply means 98 is provided with a cleaning water ejection port 980 for ejecting cleaning water.

The shutter 950 is of an L-shaped cross section with a piston 952 being coupled to a shorter side of the shutter 950. The piston 952 is actuated by a cylinder 953 to move along the X-axis directions. When actuated by the cylinder 953, a longer side of the shutter 950 is moved along the X-axis directions to open and close the opening 932a. The shutter 950 should preferably have a water-repellent upper surface on its longer side.

Figure 3:
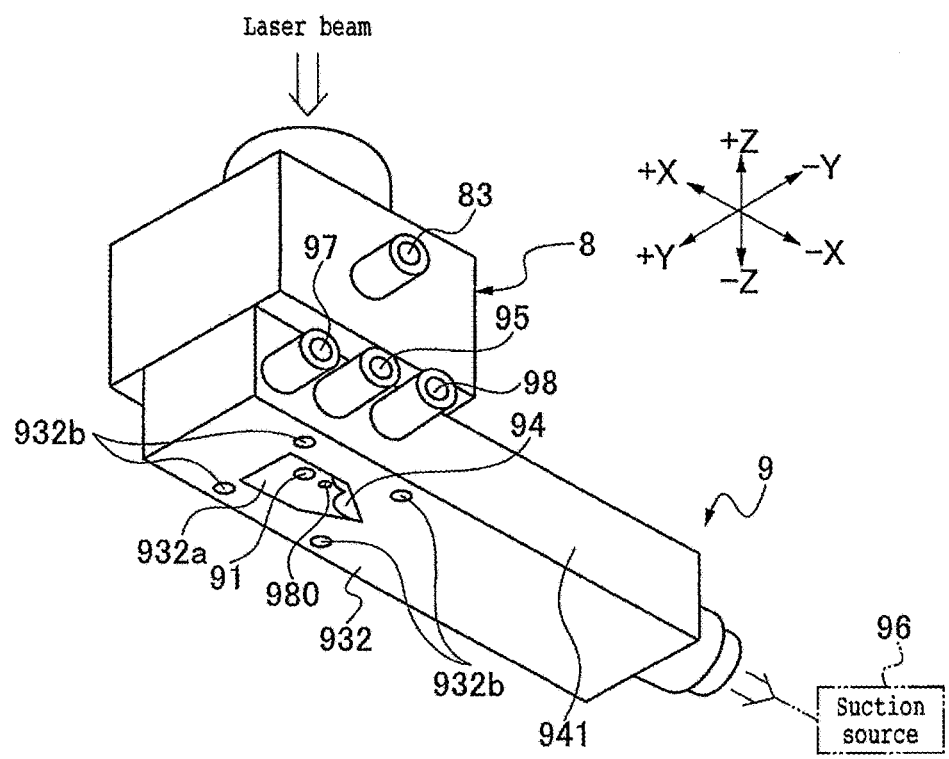
FIG. 3 is a perspective view of the beam condenser and the processing nozzle with a shutter and a shutter actuator being omitted from illustration.

As shown in FIG. 3, a plurality of magnets 932b are embedded in a lower surface of the lower wall 932. The magnets 932b are positioned on outer peripheral sides of the opening 932a in surrounding relation to the opening 932a. In FIG. 3, the shutter 950, the piston 952, and the cylinder 953 are omitted from illustration.

Figure 4:
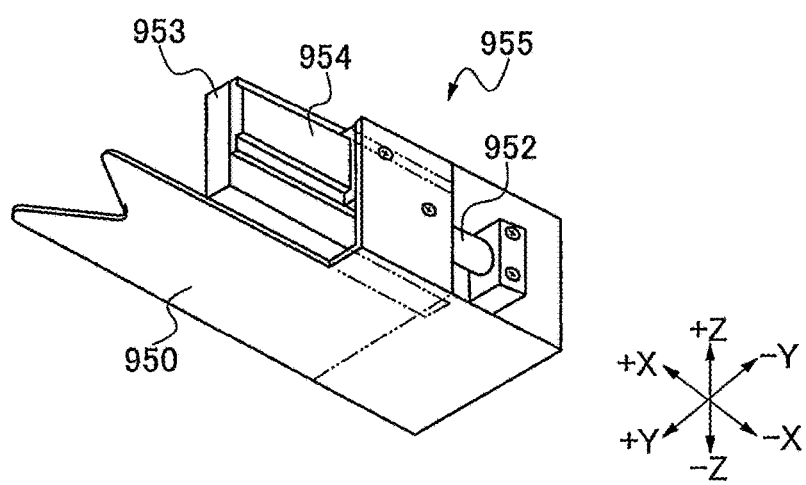
FIG. 4 is a perspective view of the shutter and the shutter actuator.

As shown in FIG. 4, the shutter 950 is actuated by the shutter actuator 955. The shutter actuator 955 is mounted on a side surface 941 of the processing nozzle 9 shown in FIG. 3. The shutter actuator 955 includes the piston 952 coupled to a proximal portion of the shutter 950, the cylinder 953 for moving the piston 952 along the X-axis directions, and a guide rail 954 for guiding the shutter 950 for movement along the X-axis directions. The shutter 950 is made of a magnetic material and is in the form of a flat plate bent into the L-shaped cross section. When the shutter 950 covers the opening 932a shown in FIG. 3, since the magnets 932b on the lower wall 932 magnetically attract the shutter 950, the opening 932a is closed off, keeping the debris trapping chamber 93 highly hermetically sealed.

The chuck table 2, the laser processing means 3, the cassette placement area 4, the positioning means 42, the loading/unloading means 43, the first transport means 5, the protective film forming means 6, the second transport means 7, the beam condenser 8, and the processing nozzle 9 described above operate under the control of control means 99 shown in FIG. 1.

For laser-processing the plate-shaped workpiece W with the laser processing apparatus 1 shown in FIG. 1, a plurality of plate-shaped workpieces W supported on respective frames F are stored in the cassette 40. The loading/unloading means 43 grips the frame F that supports one of the plate-shaped workpieces W in the cassette 40 and unloads the plate-shaped workpiece W together with the gripped frame F onto the temporary placement area 41.

In the temporary placement area 41, the positioning means 42 aligns the plate-shaped workpiece W with the predetermined position. Thereafter, the first transport means 5 transports the plate-shaped workpiece W supported on the frame F to the holder 60 of the protective film forming means 6. Then, the liquid resin is dropped onto the plate-shaped workpiece W that is held by the holder 60, and the holder 60 is rotated to spread the liquid resin over the plate-shaped workpiece W, covering the entire face side W1 thereof with a water-soluble protective film P as shown in FIG. 2.

Then, the lifting and lowering unit 71 of the second transport means 7 shown in FIG. 1 lowers the attracting unit 70, which attracts the plate-shaped workpiece W off the holder 60. The lifting and lowering unit 71 lifts the attracting unit 70, and the arm 72 moves in the direction indicated by the arrow −Y, moving the plate-shaped workpiece W to a position above the chuck table 2 positioned in the installing/removing area A. The lifting and lowering unit 71 lowers the attracting unit 70, which then releases the plate-shaped workpiece W onto the attracting unit 20 of the chuck table 2. The attracting unit 20 is operated to exert an attracting suction force to attract the plate-shaped workpiece W, and the fastening unit 21 fastens the frame F to the chuck table 2.

Then, the chuck table 2 moves in the direction indicated by the arrow −X, and one of the projected dicing lines L, which is to be processed this time, on the plate-shaped workpiece W is detected, after which the processing nozzle 9 and the detected projected dicing line L are positioned in alignment with each other with respect to the Y-axis directions. While the chuck table 2 is moving in the direction indicated by the arrow +Y or −Y, the beam condenser 8 focuses the laser beam onto the face side W1 of the plate-shaped workpiece W through the water-soluble protective film P, thereby performing an ablation process on the plate-shaped workpiece W along the projected dicing line L.

Prior to the ablation process, the shutter actuator 955 shown in FIG. 4 moves the shutter 950 along the direction indicated by the arrow −X to open the opening 932*a*. In the ablation process, the laser beam that is applied to the condensing lens 80 passes through the spaces 82 and 90, the laser beam passage port 91, and the opening 932*a* and is focused on the face side W1 of the plate-shaped workpiece W. When the laser beam is focused on the face side W1 of the plate-shaped workpiece W, the plate-shaped workpiece W is fused, producing debris. A portion of the debris enters the debris trapping chamber 93 from the opening 932*a*. The water-soluble protective film P may also be fused.

During the laser processing process, the suction source 96 is kept in operation. Therefore, the debris that is produced by the laser processing process is discharged out of the processing nozzle 9 through the suction port 94 and the suction channel 940. The debris may rise in the spaces 90 and 82. However, the processing air supply passage 83 defined in the side wall around the space 82 ejects air into the space 82, preventing the debris from being attached to the cover glass 81. At this time, the air is ejected at a rate of ten liters/minute, for example. During the laser processing process, furthermore, the cleaning air supply means 97 ejects cleaning air from the cleaning air ejection port 970 across the laser beam passage port 91, preventing the debris from clogging off the optical path of the laser beam. In order to protect the optical components from fine particles in the atmospheric air, the processing air supply passage 83 ejects air also in a stand-by mode wherein the plate-shaped workpiece W is not processed.

When the ablation process on the plate-shaped workpiece W is finished, the cleaning air supply means 97 stops ejecting cleaning air. The processing air supply passage 83 changes the rate of ejected air to 25 liters/minute, for example. After it has been confirmed that no laser beam is emitted, the cylinder 953 of the shutter actuator 955 actuates the piston 952 to move in the direction indicated by the arrow −X, moving the shutter 950 in the same direction thereby to close the opening 932*a*. The shutter 950 is now attracted to the lower wall 932 by the magnets 932*b* on the lower wall 932, hermetically sealing the debris trapping chamber 93.

Then, the ejection of cleaning air from the cleaning air supply means 97 is resumed. The cleaning means 95 and the cleaning water supply means 98 eject cleaning water respectively from the cleaning water supply port 951 and the cleaning water ejection port 980 to clean the inside of the debris trapping chamber 93 including the laser beam passage port 91. This cleaning process is carried out for approximately 60 seconds, for example, after a certain number of plate-shaped workpieces W, for example, have been laser-processed. During the cleaning process, since the opening 932*a* is closed by the shutter 950, the cleaning water is prevented from being scattered in the laser processing apparatus 1. The ejection of cleaning air from the cleaning air supply means 97 is not essential.

In the cleaning process, the suction means 92 suctions the cleaning water used in the cleaning process and discharges the cleaning water out of the processing nozzle 9. Accordingly, the debris on the upper wall 930, the side wall 931, the lower wall 932, etc. is prevented from remaining attached thereto. The suctioning capability of the suction means 92 is also prevented from being lowered. Even when debris is deposited in the suction port 94 and the suction channel 940, the deposited debris is cleared out by the cleaning water that is suctioned by the suction means 92.

After the inside of the debris trapping chamber 93 has been cleaned, the cleaning means 95 and the cleaning water supply means 98 stop ejecting cleaning water, and remaining cleaning water deposited in the debris trapping chamber 93 is removed by the air that is ejected from the cleaning air supply means 97 and suctioned by the suction means 92. If the upper surface of the shutter 950 is water-repellent, then the shutter 950 will be dried reliably and quickly. The shutter 950 that has been dried reliably will not let any water droplets fall therefrom when the shutter 950 is subsequently opened.

Then, the shutter actuator 955 moves the shutter 950 along the direction indicated by the arrow −X to open the opening 932*a*. With the debris trapping chamber 93 being open through the opening 932*a* that has been open, the cleaning air supply means 97 ejects cleaning air from the cleaning air ejection port 970 to dry the inside of the debris trapping chamber 93.

Subsequently, the processing air supply passage 83 brings the rate of ejected air back to ten liters/minute, for example, whereupon the cleaning and drying of the debris trapping chamber 93 is finished, making the laser processing apparatus 1 ready to carry out another laser processing process.

As described above, the laser processing apparatus 1 is arranged such that the shutter 950 closes the opening 932a of the debris trapping chamber 93, the suction means 92 exerts a suction through the suction port 94, and cleaning water and air are supplied to the debris trapping chamber 93 and suctioned through the suction port 94 to clean the inside of the debris trapping chamber 93. The suction means 92 suctions debris sufficiently, and the suctioned debris is prevented from remaining in the debris trapping chamber 93. The suctioning capability of the suction means 92 is prevented from being lowered, and the debris is prevented from clogging off the optical path of the laser beam during the laser processing process. Furthermore, since the debris trapping chamber 93 can be automatically cleaned under the control of the control means 99, the number of man-hours required to maintain the laser processing apparatus 1 can be reduced.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus for performing an ablation process on a plate-shaped workpiece held on a chuck table by applying a laser beam to a face side of the plate-shaped workpiece through a water-soluble protective film which protects the face side of the plate-shaped workpiece, comprising:
   a beam condenser for converging the laser beam; and
   a processing nozzle for guiding the laser beam which is converged by the beam condenser to the plate-shaped workpiece and suctioning and discharging debris scattered from the plate-shaped workpiece,
   wherein the processing nozzle includes a laser beam passage port for passing therethrough the laser beam converged by the beam condenser and guiding the laser beam to the plate-shaped workpiece, and suction means for suctioning debris that is scattered from the plate-shaped workpiece by the application thereto of the laser beam having passed through the laser beam passage port,
   the suction means includes a debris trapping chamber defined by an upper wall in which the laser beam passage port is formed, a side wall hanging from the upper wall, and a lower wall facing the upper wall and having an opening for trapping debris, a suction port holding the debris trapping chamber in fluid communication with a suction source, and cleaning means for cleaning the inside of the debris trapping chamber,
   the cleaning means includes a shutter for closing the opening of the debris trapping chamber, and a cleaning water supply port for supplying cleaning water to the debris trapping chamber when the opening is closed, and
   the shutter closes the opening of the debris trapping chamber, the cleaning water supply port supplies cleaning water to the debris trapping chamber, and the supplied cleaning water is suctioned through the suction port to clean the inside of the debris trapping chamber.

2. The laser processing apparatus according to claim 1, wherein the cleaning means further includes a cleaning air ejection port for ejecting air across the laser beam passage port toward the suction port to clean the laser beam passage port, and
   the cleaning air ejection port ejects air to clean the inside of the debris trapping chamber.

3. The laser processing apparatus according to claim 1 wherein the suction means includes a suction channel connecting the debris trapping chamber with the suction source, the suction channel having a first end and a second end, a suction port in the side wall at the first end, and the second end in fluid communication with the suction source.

4. The laser processing apparatus according to claim 1 wherein the cleaning water port is located in the upper wall.

5. The laser processing apparatus according to claim 1 wherein there are cleaning water ports on opposite sides of the laser beam passage port.

6. The laser processing apparatus according to claim 1 further comprising a shutter actuator.

7. The laser processing apparatus according to claim 6 wherein the shutter actuator comprises a cylinder and a piston.

8. The laser processing apparatus according to claim 1 wherein the lower wall has a magnet on a side adjacent to the shutter.

9. The laser processing apparatus according to claim 1 further comprising a processing air supply passage in the processing nozzle.

10. The laser processing apparatus according to claim 2 wherein there is a cleaning water port on the same side of the laser beam passage port as the cleaning air ejection port.

11. A laser processing apparatus comprising:
    a beam condenser for converging the laser beam;
    a processing nozzle for guiding the laser beam which is converged by the beam condenser to the plate-shaped workpiece and suctioning and discharging debris scattered from the plate-shaped workpiece, wherein the processing nozzle includes a laser beam passage port for passing therethrough the laser beam converged by the beam condenser and guiding the laser beam to the plate-shaped workpiece,
    a debris trapping chamber defined by an upper wall in which the laser beam passage port is formed, a side wall, and a lower wall facing the upper wall and having an opening for trapping debris,
    a suction channel connecting the debris trapping chamber with a suction source, the suction channel having a first end and a second end, a suction port in the side wall at the first end, the second end in fluid communication with the suction source, and
    a shutter for closing the opening of the debris trapping chamber, and
    a cleaning water port in one of the walls of the debris trapping chamber for supplying cleaning water to the debris trapping chamber when the opening is closed.

12. The laser processing apparatus according to claim 11, further comprising:
    a cleaning air ejection port for ejecting air across the laser beam passage port toward the suction port to clean the laser beam passage port.

13. The laser processing apparatus according to claim 11 wherein the cleaning water port is located in the upper wall.

14. The laser processing apparatus according to claim 11 wherein there are cleaning water ports on opposite sides of the laser beam passage port.

15. The laser processing apparatus according to claim 11 further comprising a shutter actuator.

16. The laser processing apparatus according to claim 15 wherein the shutter actuator comprises a cylinder and a piston.

17. The laser processing apparatus according to claim 11 wherein the lower wall has a magnet on a side adjacent to the shutter.

18. The laser processing apparatus according to claim 11 further comprising a processing air supply passage in the processing nozzle.

19. The laser processing apparatus according to claim 12 wherein there is a cleaning water port on the same side of the laser beam passage port as the cleaning air ejection port.

20. A laser processing apparatus for performing an ablation process on a plate-shaped workpiece held on a chuck table by applying a laser beam to a face side of the plate-shaped workpiece through a water-soluble protective film which protects the face side of the plate-shaped workpiece, comprising:

a beam condenser for converging the laser beam; and a processing nozzle for guiding the laser beam which is converged by the beam condenser to the plate-shaped workpiece and suctioning and discharging debris scattered from the plate-shaped workpiece, wherein the processing nozzle includes a laser beam passage port for passing therethrough the laser beam converged by the beam condenser and guiding the laser beam to the plate-shaped workpiece, a debris trapping chamber defined by an upper wall in which the laser beam passage port is formed, a side wall hanging from the upper wall, and a lower wall facing the upper wall and having an opening for trapping debris, suction means for suctioning debris that is scattered from the plate-shaped workpiece by the application thereto of the laser beam having passed through the laser beam passage port, and cleaning means for cleaning the inside of the debris trapping chamber.

\* \* \* \* \*